United States Patent [19]

Yamabe

[11] Patent Number: 4,666,264
[45] Date of Patent: May 19, 1987

[54] MIRROR USING TRANSPARENT SYNTHETIC RESIN PLATE

[75] Inventor: Taiji Yamabe, Yokohama, Japan

[73] Assignee: Marui Industry Co., Ltd., Tokyo, Japan

[21] Appl. No.: 743,361

[22] Filed: Jun. 11, 1985

[51] Int. Cl.[4] .............................. B60R 1/04; G02B 5/08
[52] U.S. Cl. ..................................... 350/641; 350/281; 350/631; 428/450; 428/457; 428/912.2
[58] Field of Search ................ 350/641, 631, 278–281; 428/425.5, 447, 448, 450, 457, 458, 912.2

[56] References Cited

U.S. PATENT DOCUMENTS

| 4,193,668 | 3/1980 | Skinner | 350/281 |
| 4,229,077 | 10/1980 | Schwab | 350/641 |
| 4,385,804 | 5/1983 | Tamura et al. | 350/641 |
| 4,465,734 | 8/1984 | Laroche et al. | 350/631 X |

FOREIGN PATENT DOCUMENTS 54-88449  7/1979  Japan .

Primary Examiner—John Petrakes
Attorney, Agent, or Firm—Cushman, Darby & Cushman

[57] ABSTRACT

A mirror comprising:
a transparent plate of a synthetic resin;
a surface-hardening layer (a) coated on an entire surface of the resin plate;
a reflective metal layer (b) deposited on the layer (a) of the back of resin, and
a back-coat layer (c) closely covering the surface of the reflective film, characterized in that said metal layer is formed by a dry metal plating, said metal being selected from the group consisting of tin or alloy of tin and copper (Sn:Cu=1:less than 0.4 by weight), thickness of layer (b) being in the range of 700–1600 Å and moisture permeability of layer (a) being smaller than those of layer (b) and layer (c) is disclosed.

7 Claims, 1 Drawing Figure

MIRROR USING TRANSPARENT SYNTHETIC RESIN PLATE

BACKGROUND OF THE INVENTION

This invention relates to a mirror of the class constituted fundamentally of a hard and transparent synthetic resin plate and a thin reflective film of a metal coated on one side of the resin plate. For example, a mirror according to the invention is suitable for use as a rearview mirror in automobiles or other vehicles.

Mirror made of synthetic resins are gaining increasing acceptance for outdoor applications. Since resin mirros are shatter-proof, they are considered preferred over conventional glass mirros for use within cars. However, mirrors within automobiles must satisfy certain safety requirements for optical parameters such as reflectance, warpage and distortion.

U.S. Pat. No. 4,385,804 issued to Tamura et al. on May 31, 1983 discloses a mirror comprising:

a transparent plate of a synthetic resin;

a surface-hardening film coated at least on a front surface of the resin plate;

a reflective film of a metal resistant to moisture deposited on the back side of the resin plate; and a back-coat layer closely covering the outer surface of the reflective film, the surface-hardening film, the reflective film and the back-coat layer being all substantially equally permeable to humidity.

As shown above, the Tamura et al. patent uses a surface-hardening film, a reflective film and a back-coat layer having substantially the same permiability to moisture. Therefore, the amount of moisture that enters the front side of the resin plate coated with only the surface-hardening film is not equal to that of moisture entering the back side of the resin coated with the above mentioned three layers, causing warpage or distortion in the resin plate.

The present inventor made various studies to eliminate these defects of the Tamura patent and found unexpectedly that either tin or a binary alloy thereof with less than 40%, of tin, of copper that was considered poorly resistant to corrosion has good properties suitable for use as a material for the reflective layer. The present invention has been accomplished on the basis of this finding.

SUMMARY OF THE INVENTION

An object of this invention is to provide a synthetic resin mirror in which distortion is hard to be caused.

This invention relates to a mirror comprising:

a transparent plate of a synthetic resin;

a surface-hardening layer (a) coated on an entire surface of the resin plate;

a reflective metal layer (b) deposited on the layer (a) of the back of resin, and a back-coat layer (c) closely covering the surface of the reflective film, characterized in that said metal layer is formed by a dry metal plating, said metal being selected from the group consisting of tin or alloy of tin and copper (Sn:Cu=1:less than 0.4 by weight), thickness of layer (b) being in the range of 700–1600 Å and moisture permeability of layer (a) being smaller than those of layer (b) and layer (c).

DETAILED DESCRIPTION OF THE INVENTION

Figure 1:
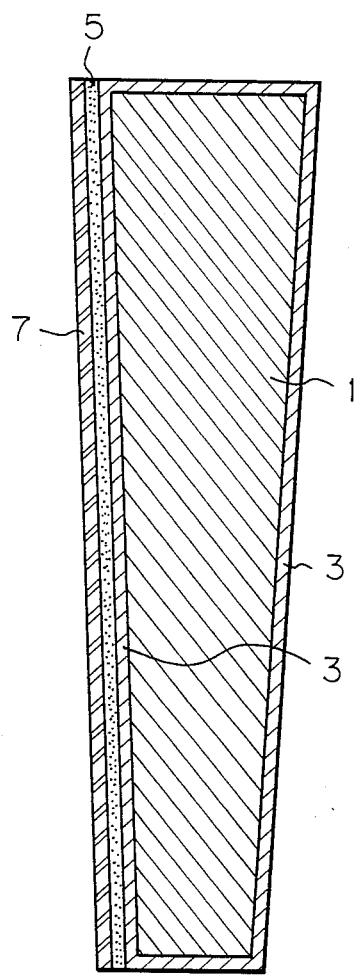
FIG. 1 is a cross-sectional view of a mirror of this invention.

The synthetic resins employed for forming the transparent plate include, for example, polyacrylates or methacrylates, such as polymethyl acrylate, polymethyl methacrylate, polyethyl acrylate, or polyethyl methacrylate. Polymethyl methacrylate is preferable.

The metals constituting the metal layer (b) include tin or tin-copper binary alloy (Sn:Cu=1:less than 0.4 by weight). The tin-copper alloy is preferable. The metal layer is formed by a dry metal plating, such as vacuum metallizing, sputtering or ion plating. Vacuum plating is preferable.

The surface-hardening layer (a) may be formed by dipping the resin plate into a solution of a synthetic resin in an organic solvent. Organo silicone resin and acrylic type resin can be used as a synthetic resin for surface hardening layer.

The back coat layer may be formed by coating on the reflective layer (b) a resin solution containing at least one inorganic powder, such as calcium carbonate, barium carbonate, aluminum silicate, etc. Alkyd resin, urethane resin and acryluethane resin are usable as the resin. The resins for surface-hardening layer and back coat layer are selected so that moisture permeability of layer (c) becomes much greater than that of the layer (b).

It is critical that the front and back surfaces of the resin plate are both flat. Preferably the both surfaces are unparallel to each other, that is the plate of the present invention has a cross section in an inverted trapezoidal form.

Referring to FIG. 1, this invention is further explained. In FIG. 1, transparent plate having a cross section in an inverted trapezoidal form is shown at 1. Surface-hardening layer 3 is coated on the entire surface of the plate 1. Reflective layer 5 is formed on the layer 3. The back coat layer 7 is formed on the reflective layer 5.

DESCRIPTION OF PREFERABLE EMBODIMENTS

Examples 1–5 and Comparative run 1–2

The transparent plate having the following dimension were used.

The plate had the cross section in an inverted trapezoidal form.

Height: 60 milli meter (mm)
Wide: 250 mm
Thickness of upper end: 5 mm
Thickness of lower end: 3 mm The surface-hardening solution employed was 70% by weight solution of organo siloxane in isopropyl alcohol. The surface-hardening solution layer was formed on the entire surface of the plate by dipping the plates into the solution.

Each of metal or metal alloys was vacuum-metallized on the plates. The back coat employed was mixture of 20% by weight of alkyd resin, 20% by weight of calcium carbonate, 20% by weight of barium carbonate and 40% by weight of xylene. The back coat layer was formed on the metal layers of all samples by coating back coat solution on the metal layer. After the resulting samples were maintained at 50° C. and humidity of 100% for 96 hours, degree of reflection and degree of distortion of the samples were measured on the basis of JIS D-5705. The results are shown in Table 1.

TABLE 1

| Example or Comparative Run | Metal layer Sn | Metal layer Cu | thickness of metal layer (Å) | Degree of reflection (%) | Degree of distortion |
|---|---|---|---|---|---|
| Ex. | | | | | |
| 1 | 1 | 0 | 700–1600 | 70.5–71.0 | less than 3% |
| 2 | 1 | 0.1 | 700–1400 | 70.0–72.0 | less than 3% |
| 3 | 1 | 0.2 | 800–1300 | 70.9–72.0 | less than 3% |
| 4 | 1 | 0.3 | 800–1000 | 70.0–70.8 | less than 3% |
| 5 | 1 | 0.4 | 900–1600 | 70.0–70.8 | less than 3% |
| Comp. Run | | | | | |
| 1 | 1 | 0.5 | 1500–1700 | 68.0–71.9 | 3–5% |
| 2 | 1 | 0.6 | 1600–1700 | 70.7–70.9 | 3–4% |

Examples 5–8 and Comparative run 3

The procedures of Example 1 were repeated except that the metal layers were formed as given in Table 2. After the samples were maintained at 50° C. and humidify of 100% for 96 hours, the degree of distortion of the samples was measured on the basis of JIS D 5705. The results are shown in Table 2.

TABLE 2

| Example or Comparative Run | Metal layer Sn Cu Cr | Thickness of metal layer (Å) | Degree of warpage (mm) | Degree of distortion (%) |
|---|---|---|---|---|
| Comp. Run 1 | 1:0.15:0.15 | 500–600 | 1–1.5 | 3 |
| Ex. | | | | |
| 5 | 1:0.15 | 700 | 0–0.5 | 2.5 |
| 6 | 1:0 | 1200 | 0–0.1 | less than 2 |
| 7 | 1:0.3 | 1000 | 0.5–0.6 | 2.5 |
| 8 | 1:0.4 | 900 | 0.5 | 3 |

Since moisture permeability of the surface-hardening layer (a) is smaller than those of the metal layer (b) and the back coat layer (c), the amount of moisture that enters the front side of the resin plate coated with only the surface-hardening film is approximately equal to that of moisture entering the back side of the resin coated with the above mentioned three layers, whereby warpage or distortion in the resin plate can be avoided.

What is claimed is:

1. A mirror comprising:
   a transparent plate of synthetic resin;
   a surface-hardening layer coated on all surfaces of the resin plate;
   a reflective metal layer deposited on the surface-hardening layer of one side of the resin plate, and
   a back-coat layer closely covering the surface of the reflective metal layer,
   wherein said metal layer is formed by a dry metal plating, said metal being selected from the group consisting of tin and an alloy of tin and copper (Sn:Cu=1:less than 0.4 by weight), the thickness of said reflective metal layer being in the range of 700–1600 Å and the moisture permeability of said surface-hardening layer being substantially smaller than those of said reflective metal layer and said back-coat layer.

2. The mirror of claim 1 wherein said metal is tin.

3. The mirror of claim 1 wherein said metal is an alloy of tin and copper (Sn:Cu=1:less than 0.4).

4. The mirror of claim 1 wherein said dry metal plating is vacuum metallizing, sputtering or ion plating.

5. The mirror of claim 1 wherein said synthetic resin is polymethyl methacrylate.

6. The mirror of claim 1 wherein said surface hardening layer is formed essentially of an organosilicone polymer.

7. The mirror of claim 1 wherein the front and back surfaces of the resin plate are both flat and are not parallel to each other.

* * * * *